United States Patent
Merrick et al.

(10) Patent No.: US 6,987,915 B1
(45) Date of Patent: Jan. 17, 2006

(54) APPARATUS AND TECHNIQUE FOR DETERMINING PLACEMENT OF OPTICAL COMPONENTS IN OPTICAL COMMUNICATION APPLICATIONS

(76) Inventors: Stephen P. Merrick, 1766 Trudeen Way, San Jose, CA (US) 95132; Lynn Wiese, 3534 Butcher Dr., Santa Clara, CA (US) 95051; Kalberer Martin, 839 Columbia Cir., Redwood City, CA (US) 94065; John Zhang, 590 Mill Circle La., Apartment 202, Santa Clara, CA (US) 95054

( * ) Notice: Subject to any disclaimer, the term of this patent is extended or adjusted under 35 U.S.C. 154(b) by 0 days.

(21) Appl. No.: 10/803,804

(22) Filed: Mar. 18, 2004

(51) Int. Cl.
*G02B 6/26* (2006.01)
(52) U.S. Cl. .................. 385/52; 385/33; 385/147; 356/123; 356/609
(58) Field of Classification Search ............ 385/31–33, 385/52, 61, 79, 93, 147; 356/123, 609
See application file for complete search history.

(56) References Cited

U.S. PATENT DOCUMENTS 6,839,493 B2 * 1/2005 Berto .................. 385/52

* cited by examiner

*Primary Examiner*—Phan T. H. Palmer
(74) *Attorney, Agent, or Firm*—Shemwell Mahamedi LLP (57) ABSTRACT

An embodiment described herein provides a technique to determine a focus point of a lens. Light is directed from a light source through the lense and onto a target surface. The light source and target surface may be positioned on opposite sides of the lense. The target surface may correspond to the position of where a primary light source for the particular application is to be located. A reflection passing through the lense from the reflective target surface may be located. A determination is then made as to whether the position where the reflection was located also could also corresponds to a focus point for the lense, if the primary light source was to be located at or near the target surface.

25 Claims, 6 Drawing Sheets

APPARATUS AND TECHNIQUE FOR DETERMINING PLACEMENT OF OPTICAL COMPONENTS IN OPTICAL COMMUNICATION APPLICATIONS

TECHNICAL FIELD

The disclosed embodiments relate generally to the field of optics. In particular, the disclosed embodiments relate to determining placement of optical components in optical communication applications.

BACKGROUND

Optical communication applications typically require the transfer of light from a laser, through a lense, and into an optical fiber. Given that the cross-sectional diameter of an optical fiber is very small, the laser beam and the optical fiber have to be aligned precisely with one another. Furthermore, the laser beam has to sufficiently energize the optical fiber in order for the fiber to be able to carry an optical signal. This means that the laser beam has to be focused when it hits the cross-section of the optical fiber.

The placement of the optical fiber relative to the lense and the laser is a problem that many conventional apparatuses and techniques address. Typically, the optical fiber is terminated in a ferrule and positioned within a nose section. The nose section is then moved and positioned with respect to a laser housing that contains the laser and lense. Once a suitable position is found where the laser beam from the laser will intersect and focus on the fiber, the nose section and the laser housing are fixed (e.g. by welding) to one another. Under a conventional approach, in order to find a suitable position of the nose section, the axial and lateral positions of the end of the optical fiber (which is held in the ferrule) are adjusted with respect to the laser and the lense. The goal is to make the adjustment so that laser's beam intersects the fiber while it is in focus.

Expensive machinery is normally used to connect and align optical communication components together in a manner that permits the laser beam of the optical application to be in focus for its intended purpose. Many single mode optical communication applications use laser welding to optically couple a laser with an optical fiber. A laser welding apparatus, manufactured under the name NEWPORT LASER SYSTEM, by NEWPORT INC., is, for example, one type of apparatus for performing precision alignment and welding of two optical components.

BRIEF DESCRIPTION OF THE DRAWINGS

FIG. 7 illustrates implementation of a method such as described in FIG. 5, step 510, 520, using components and techniques as described and illustrated with FIGS. 1–3C In the drawings, the same reference numbers identify identical or substantially similar elements or acts. To easily identify the discussion of any particular element or act, the most significant digit or digits in a reference number refer to the Figure number in which that element is first introduced. Any modifications necessary to the Figures can be readily made by one skilled in the relevant art based on the detailed description provided herein.

DETAILED DESCRIPTION

General Overview

Embodiments of the invention provide a technique for placing optical components in cooperative alignment with one another. In general, optical applications tend to require precision placement and alignment of optical components. Of particular importance, the placement of a lense and/or receiver for a laser requires determination of focal points and lengths where a laser's energy can be maximized.

According to an embodiment, a focus point (or length) is determined for a laser source that is passed through a lense. The focus point is found without having to use the laser that generates the laser beam, or expensive optical alignment equipment. As such, embodiments of the invention provide a more cost-effective focusing technique for optical applications in which a laser beam is passed through a lense.

An embodiment described herein provides a technique to determine a focus point of a lense. According to one embodiment, light is directed from a secondary light source through the lense and onto the laser emitting surface. The secondary light source and laser emitting surface may be positioned on opposite sides of the lense. The reflection off the laser emitting surface passing through the lense is then re-focused. A determination is then made as to whether where the focused lense position is.

Determining Focus Length for Optical Components

Figure 1:
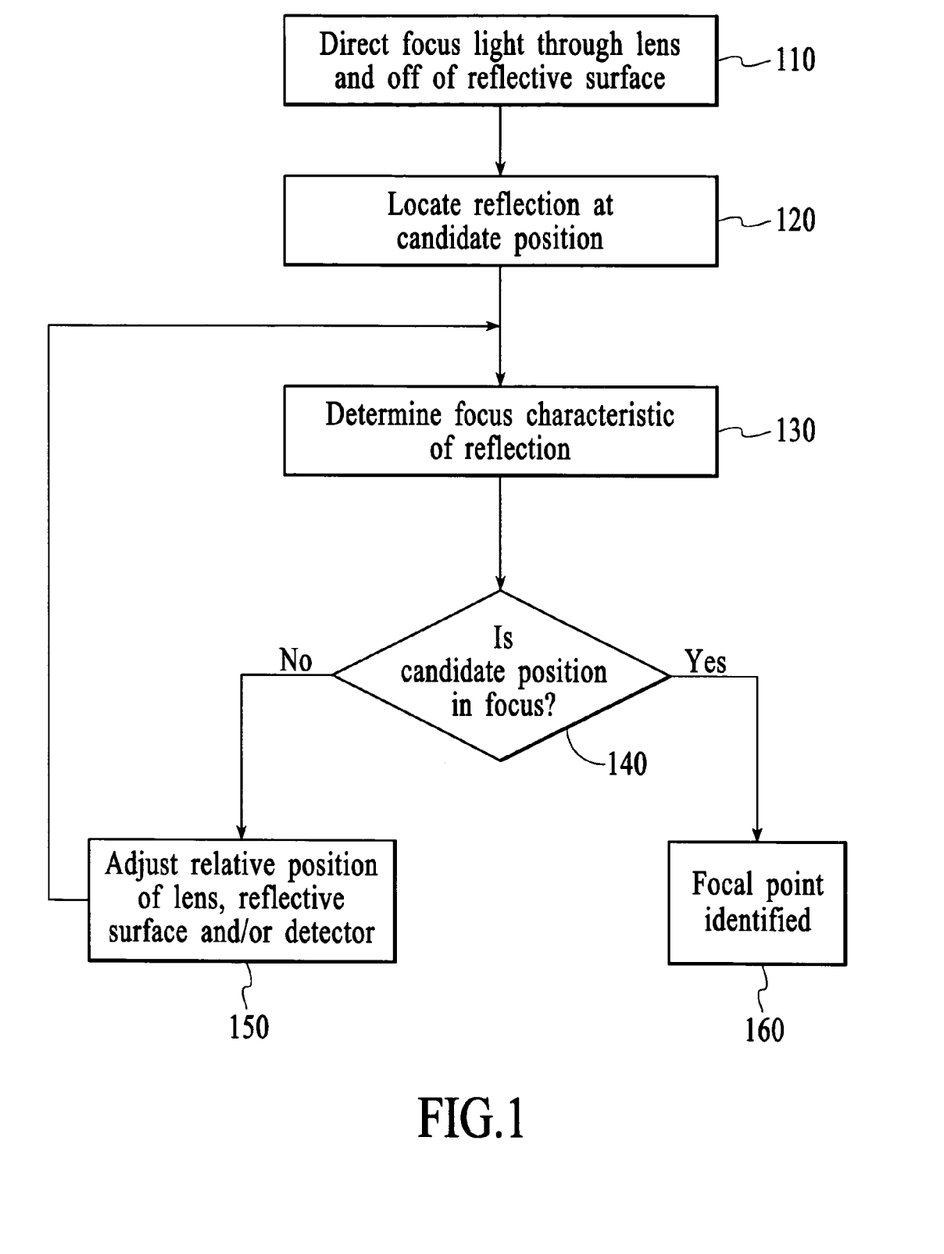
FIG. 1 illustrates a technique for determining placement of a component in an optical application, according to an embodiment of the invention.

FIG. 1 illustrates a technique for determining placement of a component in an optical application, according to an embodiment of the invention. A standard method assumes an environment in which a primary light source is used to send light through a lense and is focused. The light has to be in focus in order for this light to be properly received by the receiving component. Precise determination of this position is critical for placement of the other components. A method such as described in FIG. 1 enables the receiving component to be in focus for the primary light source, without having to first use the primary light source to determine either (i) the focus point for the receiving component, or (ii) whether the receiving component is in fact in focus for the primary light source and lense.

In a method such as described, a secondary light is used to determine the focal distance of the lense and the primary light source. In one embodiment, the focal distance of the lense, as used by the primary light source, is determined without having to first use the primary light source. Step 110 provides that a focus light is directed (from a secondary source other than the primary light source) opposite the primary light source through the lense and off of an at least partially reflective target surface. The target surface may correspond to the position (or alternatively a known position relative to) of the primary light source.

Step 120 provides that a reflection from the reflective target surface is found at a candidate position. This position may be on the same side of the lense as the secondary light source that generated the focus light. Various techniques are described in this application, including with FIGS. 3A–3C, for locating the reflection that originates from the target surface and passes through the lense.

In step 130, a focus characteristic of the reflection is determined, measured, or otherwise observed. In one embodiment, the focus characteristic corresponds to a dimension of the reflection, as captured or received on some medium. For example, in step 120, the reflection may be captured on a pixel array. In one embodiment, a diameter of the reflection as captured on the medium corresponds to the focus characteristic. In another embodiment, an optical fiber is used to catch the reflection from the target surface. In such an embodiment, the focus characteristic corresponds to the amount of energy that is absorbed by the optical fiber.

Step 140 provides that a determination is made, based at least in part on the focus characteristic of the reflection, as to whether the candidate position is in focus for a primary light. lense.

If the determination is that the candidate position is not in focus, then step 150 provides that the relative position of at least one of the primary light source, the lense, and the candidate position is adjusted. In one embodiment, the relative positions of the primary light and lense are adjusted until a designated point on the other side of the lense is the focal point or length. In another embodiment, a position of the medium that captures the reflection is adjusted axially with respect to the lense. Then, step 140 is repeated, until in step 160, the candidate position is determined to be in focus for the primary light.

In applications such as optical communications, use of the primary light source to determine focus is expensive, requires additional equipment and/or requires more handling of the components. Furthermore, it may be necessary to determine the focal distance from the lense without having the laser beam turned on. For such applications, a technique such as provided in FIG. 1 enables the determination of the focal distance, and even the focal point of the lense, without need for the primary light source. Less equipment is necessary to align with this method, and increased throughput can be realized.

System for Determining Focus Point

Figure 2:
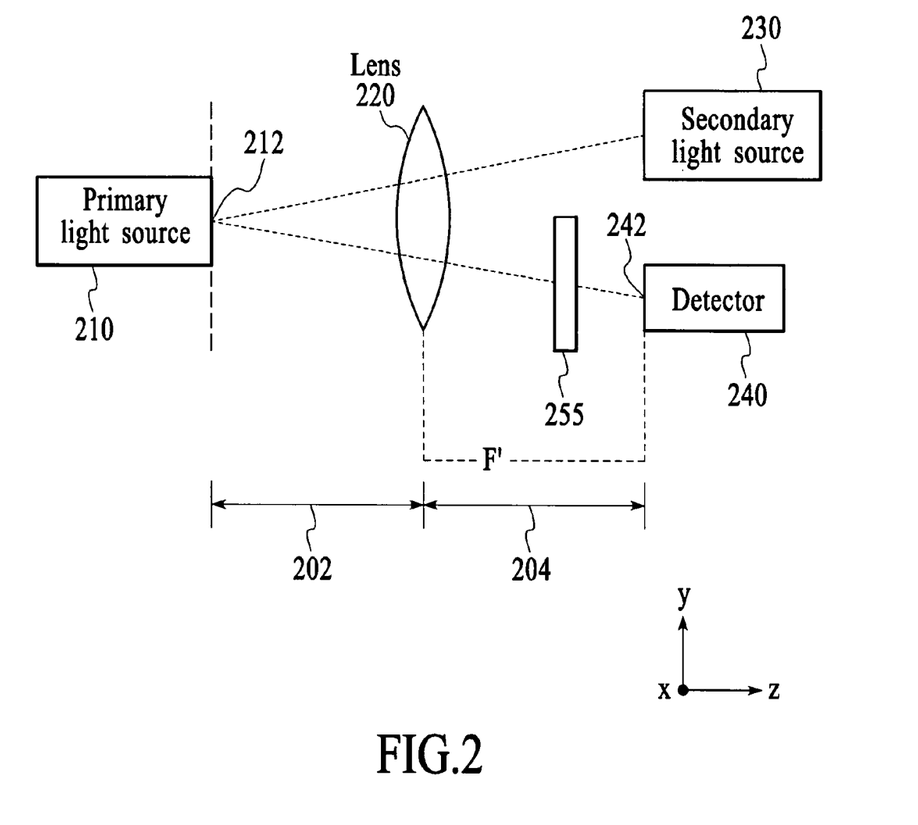
FIG. 2 illustrates a system for determining a focal length of a lense, as used by a light source, under an embodiment of the invention.

FIG. 2 illustrates a system for determining a focal length of a lense, as used by a secondary light source. A system such as described in FIG. 2 may be used to perform a method such as described in FIG. 1.

A system includes a primary light source 210, a lense 220, a secondary light source 230, and a detector 240. For certain applications, an optical magnification mechanism ("magnifier) 255 may also be included with the system. The primary light source 210 may be positioned at a first side 202 of the lense 220, while the secondary light source is positioned on a second side 204 of the lense 220. The detector 240 is also positioned on the second side 204, opposite the primary light source 210. The first side 202 and the second side 204 form opposite sides of a boundary formed by the lense 220, when viewed two-dimensionally.

When placed in operation, the primary light source 210 directs light through the lense 220 and onto a receiver (not shown). The particular type of receiver may depend on the application. In an embodiment, the primary light source 210 is a laser. The lense 220 may be fixed relative to the primary light source 210 to focus the light from the primary light source. As will be described, given the particular spacing of the primary light source 210 and the lense 220, the detector 240 may be used to determine whether a particular point on the second side 204 is at the focal point (F') of the lense 220 and primary light source 210. The magnifier 255 may be positioned to magnify the reflection from the lense 220 to the detector 240. The primary light source can be a generic point source that can be focused by some sort of lense focusing system. One embodiment is a laser or LED light source. The lense can be a traditional refractive lense or some other optical focusing system such as a reflective and or diffractive.

According to an embodiment, secondary light source 230 directs light from the second side 202 through lense 220 and off of a reflective surface 212. The reflective surface 212 may share a plane with a point of origin for light emitted from the primary light source 210. The secondary light source 230 may have characteristics to enable sufficient reflection to pass back through the lense 220 and onto the second side 204. In one embodiment, the secondary light source 230 is a laser, although it is possible to use an other coherent or incoherent light sources.

Light from secondary light source 230 is reflected off of the surface 212, passed through lense 220 and then detected by detector 240. The detector 240 may be used to determine the characteristic of the reflection and is then used to determine whether a candidate position 242 of detector 240 is optimal or in focus. While FIG. 2 illustrates that the candidate position 242 is coplanar with a detection plane, it is possible for candidate position 242 to alternatively be outside of the detection plane. Alternatively, the focus characteristic may be used to determining how proximate the candidate position 242 is from being in focus for the lense 220 and the primary light source 210. According to an embodiment, once a suitable in-focus position is found for detector 240, that position is then noted for the receiver that is to be part of the application for the primary source 210.

Initially, detector 240 may be placed at the candidate position 242. The position of the reflection from the secondary light source 230 in the X (into the paper) or Y (vertical) directions may be unknown at first because, amongst other reasons, secondary light source 240 may be slightly angled, and target surface 212 may not be perfectly straight. There may also be deviations in the lense 220 that may make it difficult to find the reflection of secondary light source 230 off of surface 212 in the X, Y and Z directions. Most importantly the position of the light source 210 and lense 220 are not generally known to the accuracy required. Therefore, it may be necessary to move the detector 240 in two or three dimensions in order to locate the reflection and the focus point of the reflection.

According to an embodiment, the position of detector 240 may be determined as being optimal if the reflection is in focus. If the reflection is not in focus, any of the detector 240, secondary light source 230, lense 220, or primary light source 210 may be adjusted until the focus characteristic of the reflection indicate that the reflection is in focus at a particular candidate position. If focusing is necessary, adjustment of detector 240, secondary light source 230, lense 220, or primary light source 210 may be primarily in a Z-direction At this point, the position of the detector 240 corresponds to a determined focal point or length of the lense 220.

Detectors for Determining a Focus Length from the Lense

Figure 3A:
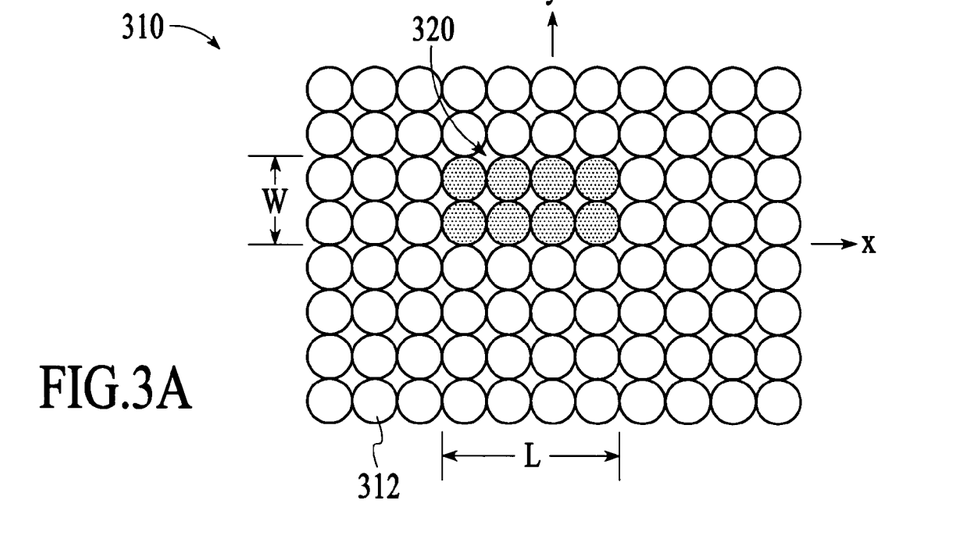
FIGS. 3A–3C illustrate various alternative mechanisms that can be used for a detector of reflection, under embodiments of the invention.
Figure 3B:
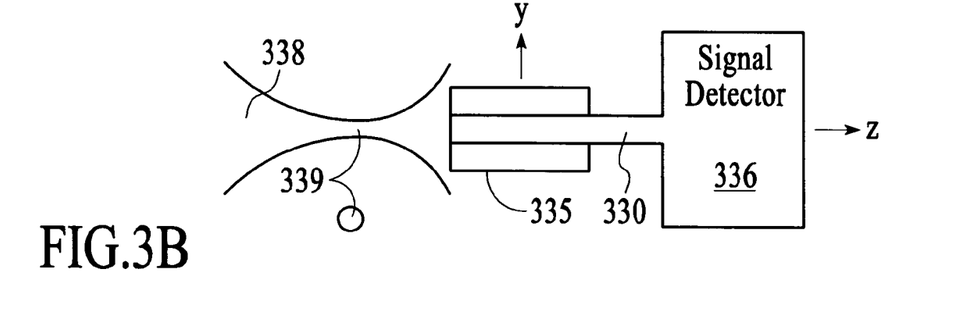
Figure 3C:
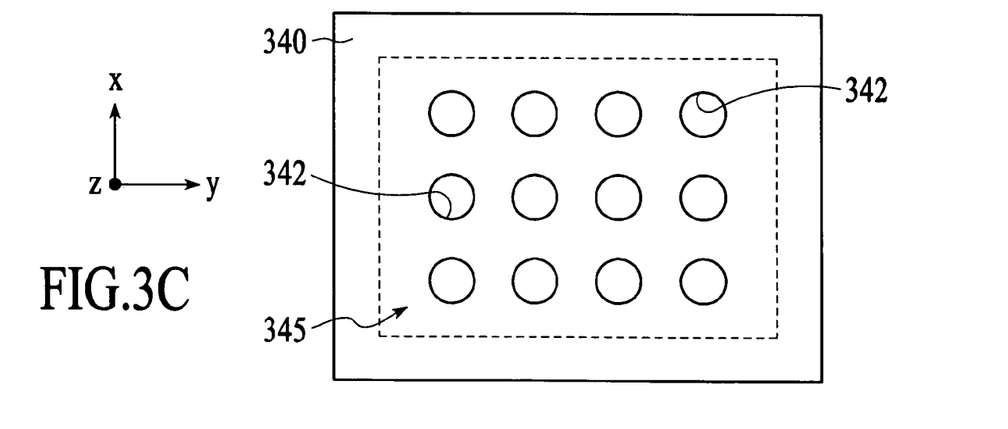

FIGS. 3A–3C illustrate various alternative mechanisms that can be used for a detector 240, such as shown and described with FIG. 2. As explained above, the detector 240 should be able to capture the reflection of the light from the secondary light source 230, and indicate some focus characteristic about the reflection at a particular position with respect to the lense 220. The focus characteristic may be used to adjust the position of the detector 240, secondary light source 230, the lense 220, and the primary light source 210 until the particular position is made to be in focus, and/or until the focal length for the primary light source 210 and lense 220 is found. In describing embodiments of FIGS. 3A–3C, reference may be made to elements of FIG. 2 to provide an operation context for such embodiments.

FIG. 3A is a frontal view of a pixel array 310, for use as detector 240 (see FIG. 2), according to an embodiment. The frontal view may correspond to the X and Y axes, using the reference of FIG. 2. Pixel array 310 may be part of a charged couple device (CCD) type camera. Individual pixels 312 of pixel array 310 may actually be too large for the reflection to be noticed or captured. Accordingly, as described above, magnifier 255 is positioned on the second side 204 of lense 220 to magnify the reflection. A reflection 320 is illustrated in FIG. 3A by the darkened pixels.

The pixel array 310 and secondary light source 230 may be placed at a candidate position corresponding to some axial distance from lense 220. Because an array is used, there may not be a need to locate the reflection in the X and Y directions. When reflection 320 first appears, a dimensional aspect of the reflection is determined. This dimensional aspect may correspond to the focus characteristic. In one embodiment, a dimension of the reflection 320 is minimized when the reflection is in focus. The dimension of the reflection may be determined by any of the dimensions l, w, as shown in FIG. 3A. Alternatively, either one of area or diameter measurements may be made. Still further, the number of pixels in the pixel array 310 that capture the reflection may reflect the dimension of the reflection 320.

Pixel array 310 may be moved back and forth along the axis Z (which in FIG. 3A is into or out of the paper) until a minimum dimension for reflection 320 is found. The position along the axis Z where the minimum reflection 320 occurs is the determined focal distance or position. According to an application, an optical component for receiving light from primary light source 310 may be placed at this position.

FIG. 3B is a side view of an embodiment in which the detector 240 (FIG. 2) corresponds to another optical fiber 330. The side view may correspond to the Y and Z direction, using the reference of FIG. 2. A cross-section of optical fiber 330 may be exposed through use of a ferrule 333 or other component. The reflection is illustrated by a diffraction pattern 338, which converges to a minimum size 339 at a position o.

Either one of the optical fiber 330, secondary light source 230, lense 220, or primary light source 210 may be moved along the Z axis until an entrance of the fiber intersects the position o. If the location of the reflection is known, the Z-axis alignment is the only necessary alignment. At that point, a maximum amount of energy from the reflection is transferred into the fiber 330. The reflection, at its minimum size 339, may be sufficiently small to be absorbed by the fiber 330. A signal detector 336 may be connected to the fiber 330 to measure the energy. When the energy of the fiber is maximized, the determination may be made that the entrance of fiber 330 is at the optimal distance from the lense 220 (FIG. 2). This corresponds to positioning the opening of the fiber at position o, which corresponds to the focal point for the lense 220.

According to another embodiment, signal detector detector 335 may correspond to an optical fiber. Alternatively, signal detector 335 may correspond to a detector that is the size of an optical fiber.

Because the cross-section of fiber 330 is fairly small, an embodiment such as described in FIG. 3B may require placement of the fiber in all of the X, Y, and Z coordinates. One technique for determining the focal point is to move the fiber 330 along the X and Y axes until some reflective energy is detected by signal detector 336. Once a minimal amount of energy is detected, the fiber 330 is positioned in X and Y to the center of the reflected energy. The position of the header 410 may be adjusted in the Z direction until that energy is maximized. At that point, the focal point, or the position o, is found, or at least approximated. Another technique would encompass moving in X and Y until maximum energy is detected stepping Z and then repeat.

An embodiment such as illustrated by FIG. 3B may act as an alternative to a detector shceme that uses an array of pixels. Specifically, instead of an array of pixels, an embodiment may use a single detector such as described in FIG. 3B. The single detector may, for example, operate as in isolated pixel.

FIG. 3C is a frontal view of an embodiment in which the detector 240 (FIG. 2) corresponds to a mask 340 on an image capturing medium 345. FIG. 3C illustrates the mask 340 and image capturing medium 345 extending along the X and Y axes, using the reference of FIG. 2. The mask 340 may include multiple apertures 342 (or other openings such as stripes), where each aperture is about the size of a focused spot size (or perhaps slightly larger). The mask 340 may move, vibrate or shake in the X and/or Y directions. At any instant in time, it may either capture the light at its focused spot size, or obscure the light. If the light is captured at the focused spot size, then a peak is detected on the underlying medium 345. Therefore, by moving the mask 340 in the X and/or Y axes, the detector 345 modulates a signal having a peak. Adjustments may be made to one or more components in the Z-direction, including adjustments to the position of the lense, reflected surface or mask. As the mask 340 is moved closer to the point where the light has a minimum focused spot size, the amplitude of the modulated signal at the detector 345 increases. Once the spot size is smaller than the aperture 342, the amplitude of the modulated signal stabilizes, so that the peak-to-peak amplitude is about the same. At this point, the optimal position with respect to the Z-axis is found.

Optical Communication Application

In order to modulate and generate signals on an optical fiber, an end of a fiber is optically coupled to a laser that subsequently modulates to create an optical signal. The manner in which an end of the optical fiber is brought into proximity and focus for the laser has, under conventional approaches, been problematic.

Figure 4:
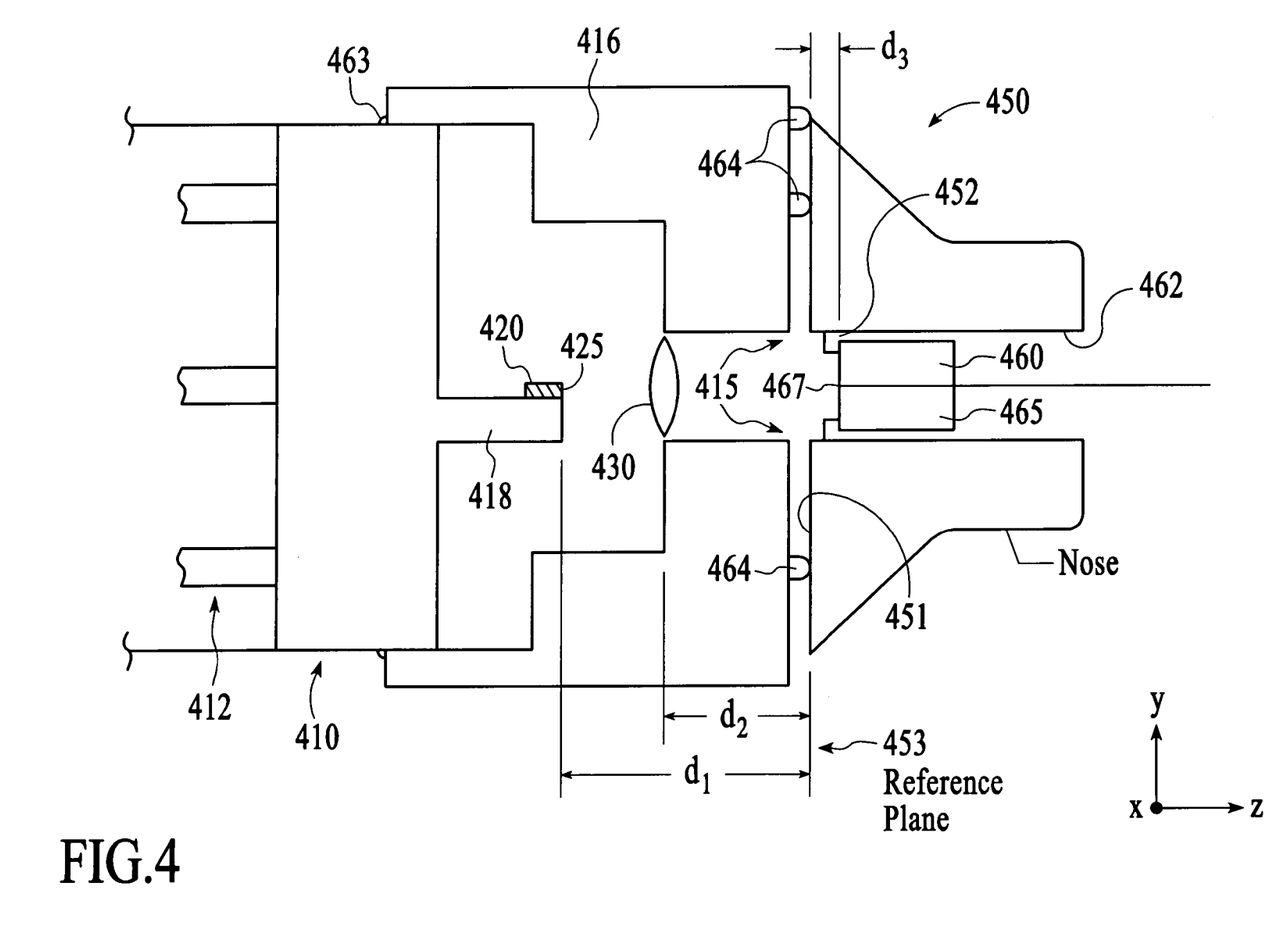
FIG. 4 illustrates an assembled optical communication device for which embodiments of the invention may be utilized.

FIG. 4 illustrates an assembled optical communication device comprising a header 410 that is aligned in the Z-axis to sleeve 416 and fixed in position. The nosepiece 450 is then aligned in the X and Y planes while in intimate contact to the reference plane, face of sleeve 416, then fixed in position. The header 410 includes a platform 418 which extends from the header 410, upon the platform 418 a laser 420 is mounted. A lense 430 is positioned a distance d2 from the reference plane 453. A lense in opening 415 in the sleeve 416 coincides with where a laser beam from laser 420 is located once it passes through the lense 430.

In nosepiece 450, a ferrule 460 is positioned within a receiving chamber 462 for the laser beam. A fiber 465 terminates in the ferrule 460. When the assembly is made operational, a tip 467 of the fiber 465 is energized by the laser 420. Under normal practice, a distance d3 between a fiber tip 467, of where the fiber 465 terminates, and a frontal facade 451, of the nosepiece 450, is tightly controlled and a known parameter. In current applications, the distance d3 is known to within 10 microns, and it sets the desired location for the focal point of the lense 430 when the assembly is made operational.

Due to the nature of optical communications, an optical communication device such as shown in FIG. 4 has very tight tolerances, particularly in the manner in which the fiber 465 and lense 430, is brought into the range of focus for the laser 420. For single mode applications, the desired approach is to precisely align and attach the header 410 to the sleeve 416 and then to the nosepiece 450. Due to the extremely tight tolerances, considerable attention and expertise has to be paid to properly welding the nosepiece 450 to the sleeve 416 and the sleeve 416 to the header 410. One conventional and effective approach for making this attachment requires the use of sophisticated and expensive laser welding and alignment machinery. A LW4000, manufactured by Newport Corporation is an example of such machinery.

Under one conventional approach, header 410, sleeve 416, and nosepiece 450 are rough aligned in fixtures with the nosepiece 450 held in intimate contact with sleeve 416 at the reference plane 453. The laser 420 is powered up, the nosepiece is actively aligned in the X,Y direction to find the laser spot. Header 410 is actively aligned along the Z-axis to maximize the laser 420 output on the fiber tip 467. The header 410 and sleeve 416 are attached at welds 463. Nosepiece 450 is again actively aligned in the x, y direction to maximize the light coupled into the fiber 465, the nosepiece 450 is then attached to the sleeve 416 with welds 464.

Figure 5:
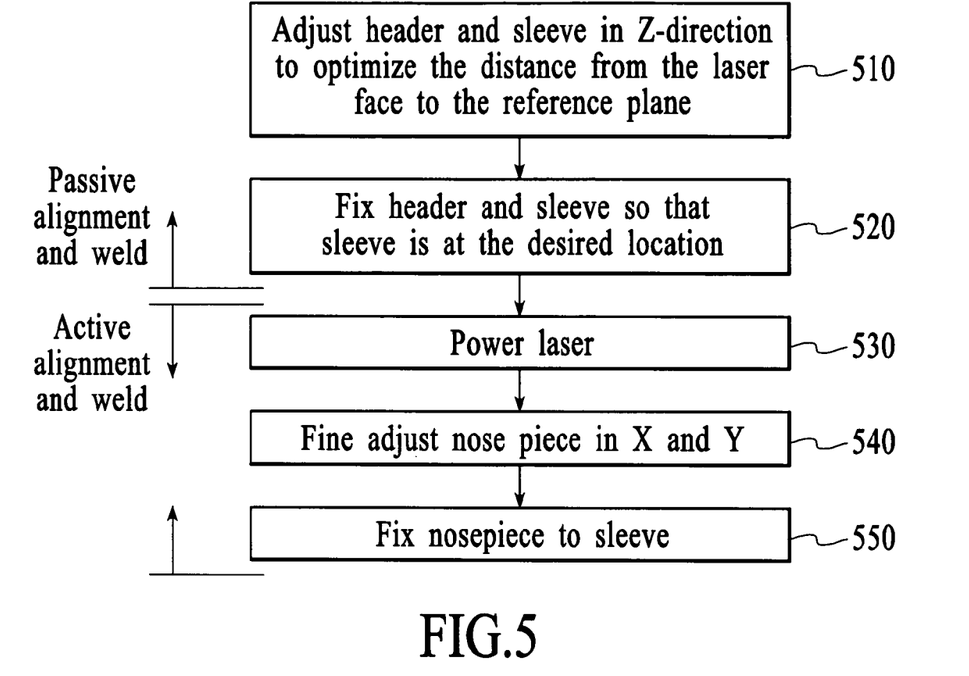
FIG. 5 illustrates a method for connecting components of an optical communication device such as shown in FIG. 4.

FIG. 5 illustrates a method, according to an embodiment, for connecting components of an optical communication device such as shown in FIG. 4. In particular, FIG. 5 illustrates a method for connecting, in precise alignment, the nosepiece 450 with the laser housing 410. In describing a method of FIG. 5, reference to numerals of FIG. 4 are made primarily for illustrating suitable components for implementing a step of the method.

Prior to use of any laser welding machinery (as required under the conventional approach), step 510 provides that the header 410 and sleeve 416 are adjusted in the Z-direction in order to optimize the distance from the laser face to the reference plane 453. As part of the step, an alignment of the fiber tip 467 in nosepiece 450 with respect to lense 430 is made in the Z-direction. The alignment may be performed by fixing the ferrule 465 within the nosepiece 450, and fixing the nosepiece to the sleeve 416. Then, the sleeve 416 may be moved over or with respect to the header 414 in order to adjust the lense 430 relative to the ferrule tip 467. As a result of the alignment, the lense 430 will be able to focus a laser beam from the laser 420 onto the ferrule tip 467.

Step 520 provides that header 410 and sleeve 416 are fixed. This results in ferrule tip 467 being fixed with respect to the lense 430 so that the ferrule tip is at a focal point of the lense. Since the distance d is known, one embodiment provides that this step may be performed by welding (or using other fixation means) sleeve 416 and header 410 together (assuming the nose section 450 holds the fiber 465 and is fixed with respect to the laser housing 410). Because the laser 420 is not powered, steps 510 and 520 are said to be passively aligned and welded. According to one embodiment, techniques illustrated with FIGS. 1–3C may be used to perform the passive alignment and weld of this step.

Once the passive alignment step is performed, step 530 provides that the laser welding and alignment apparatus is powered. Unlike conventional approaches, the apparatus is powered after the Z-alignment and fixation occurs. This saves considerable expense.

In step 540, the nosepiece 450 and the sleeve 416 are aligned in the X and Y directions using the laser welding and alignment apparatus of step 540. Then, step 550 provides that the nosepiece 450 is fixed in X and Y with respect to the sleeve 416 using welding or other fixation means. Steps 530–550 are referred to as an active alignment in that the laser 420 is powered up during alignment.

Figure 6:
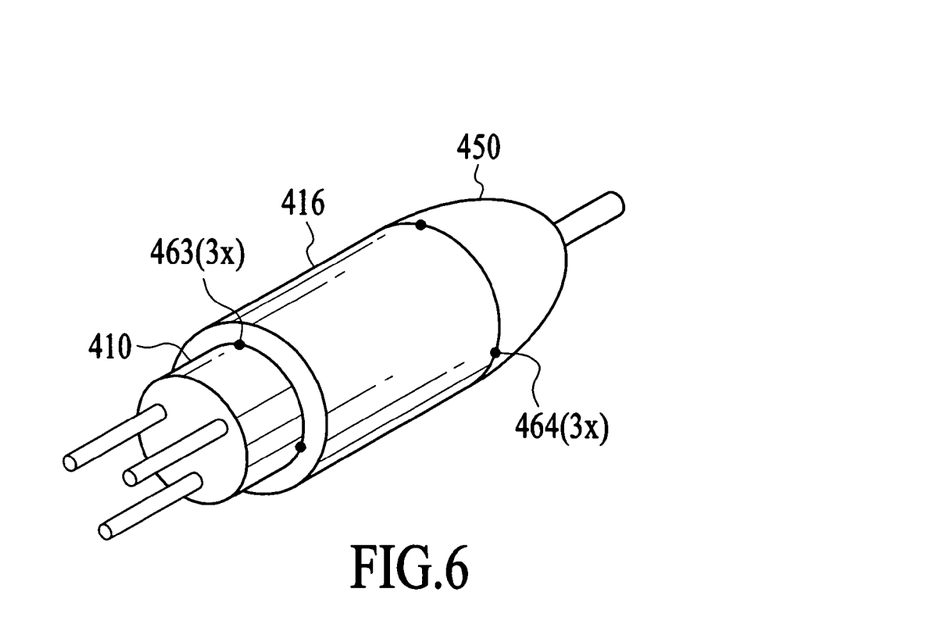
FIG. 6 is an isometric view of the optical communication device of FIG. 4

FIG. 6 is an isometric view of the optical communication device of FIG. 4. FIG. 6 illustrates desired attachment spots that result, under one embodiment of the invention, from the passive alignment and fixation of header 410 to sleeve 416 and active alignment and fixation of sleeve 416 and nosepiece 450. In particular, FIG. 6 illustrates three weld spots 463 placed 120 degrees apart between the header 410 (FIG. 4) and the sleeve 416 (FIG. 4). Additional weld spots 464 connect the sleeve 416 to the nosepiece 450. In one embodiment, weld spots 463 are the result of performing steps 510 and 520, and weld spots 464 are the result of performing steps 540 and 550. However, it should be noted that weld spots 463 can also be formed using active alignment and fixation methods, albeit at much higher cost.

Figure 7:
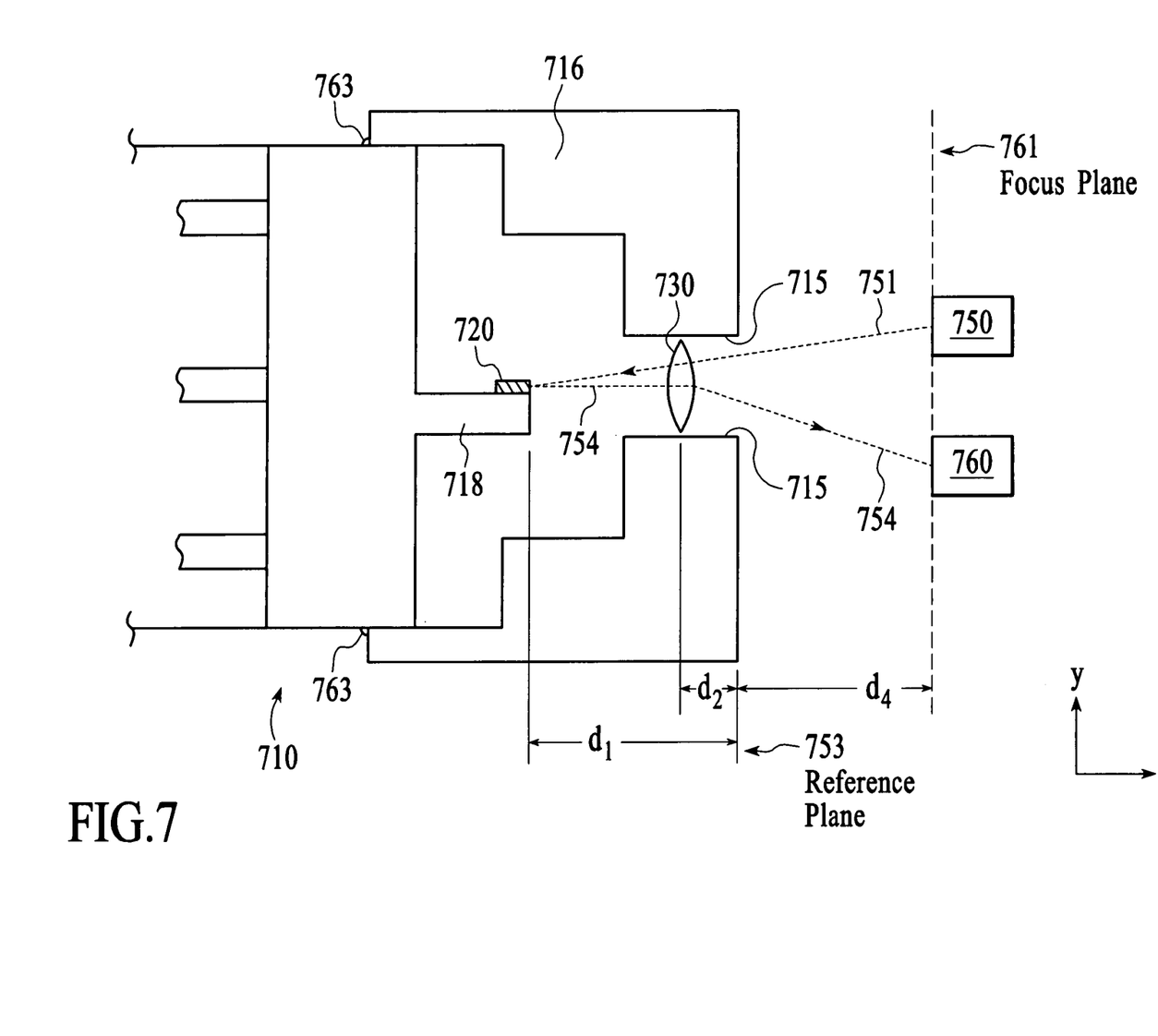

FIG. 7 illustrates implementation of a method such as described in FIG. 5, in particular steps 510 and 520 using components and techniques as described and illustrated with FIGS. 1–3C. A header 710 is shown. A sleeve 716 is placed over the header 710. A platform 718 extends from the header 710, upon which laser 720 is mounted. A lense 730 is positioned a distance from the reference plane 753. An opening 715 in the sleeve 716 enables emission of a laser beam from the laser 720.

According to one embodiment, a passive alignment (such as described in step 510 of FIG. 5) may be performed using a secondary light source 750 and detector 760. The secondary light source 750 and detector 760 may be temporarily fixed to the sleeve 716 at a known distance d4 (d4 is generally equal to d3 in FIG. 4 but it is possible for the two parameters to be different). A light beam 751 may be directed from the secondary light source 750 through lense 730 and onto a reflective (or partially reflective) target surface 725 of the laser 720. The reflection 754 may be captured by detector 760. The detector 760 may be any medium on which a reflection can be captured and analyzed. Examples of detector 760 are provided in FIGS. 3A–3C.

In an embodiment, detector 760 is placed at the desired focal point. As described with FIG. 4, the desired focal point may be known a distance, d3, from the reference plane 753 of the sleeve 716.

In an embodiment, header 710 and laser 720 may be moveable in the Z-direction with respect to the sleeve 716. The proper distance of the lense 730 is fixed, distance d2, relative to the reference plane 753. The proper distance of the laser 720, distance d1, is found by directing beam 751 from secondary light source 750, through lense 730 and off of target surface 725 of the laser 720. A reflection 754 results, which may carry through lense 730 and onto detector 760. Detector 760 may provide analysis of a focus characteristic of the lense/laser system. For example, detector 760 may correspond to a defined core optical fiber into a single detector. Intensity variation through scanning in plane coincident with Focus plane 761 permits the dimension of the reflection to be determined. The header 710 and laser 720 may be moved in the Z-direction. The detector 760 is scanned again in the plane coincident with focus plane 761 and the dimension of the reflection is determined. This operation is repeated between moving in Z and scanning incrementally. The detector 760 is in focus when the reflection 754 appears to have a minimal dimension. To further the example, should the dimension of the reflection 754, as captured on the detector 760 decrease with movement of the header 710 and laser 720 in a particular direction, then start to increase without a change in the direction of the header 710 and laser 720 a minimum of the reflection is determined to have been found. This may coincide with the appearance of a minimum spot size. The position of the laser 720 with respect to the reference plane 753 when the minimum is found is then fixed through weld 763 or other fixation means. In this way passive alignment may be performed.

Alternative Embodiments

In another embodiment, header 710 and lense 730, along with laser 720 may be moveable in the Z-direction. The proper distance of the lense 730 from the reference plane 753, distance d2, is found by directing beam 751 from secondary light source 750, through lense 730 and off of the target surface 725 of the laser 720. A reflection 754 results, which may carry through lense 730 and onto detector 760. Detector 760 may provide analysis of the reflection's focus characteristics. For example, detector 760 may correspond to a pixel array, which permits a dimension of the reflection to be determined. In such an example, the detector 760 is in focus for the lense 730 when the reflection 754 appears on the detector and has a minimal dimension. To further the example, should the dimension of the reflection 754, as captured on the detector 760 decrease with movement of the header 710, lense 730 and laser 720 in a particular direction, then start to increase without a change in the direction of the header 710, lense 730 and laser 720, a minimum of the reflection is determined to have been found. The position of the laser 720 and lense 730 with respect to the reference plane 753 when the minimum is found is then fixed through welding or other fixation means. In this way, passive alignment may be performed.

With reference to embodiments described above, multiple lenses may be used, rather than a single lense. For example, in reference to an embodiment such as shown in FIG. 7, multiple lenses may be substituted for lense 730. The focal length of each lense may be determined in a manner such as described above.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

We claim:

1. A method for determining a focus point of a light source and lense, the method comprising:
   directing light from a light source through the lense and onto a target surface, the light source being positioned on a first side of the lense and the target surface being positioned on a second side of the lense;
   detecting, at a position on the first side of the lense, a reflection of the light from the light source reflecting off of the target surface;
   making a determination, based at least in part on a focus characteristic of the reflection, whether the position on the first side of the lense would be sufficiently in focus for a second light that would originate from near the target surface.

2. The method of claim 1, wherein the step of making a determination includes determining that the position on the first side of the lense would be out of focus for the second light.

3. The method of claim 2, further comprising the step of adjusting at least one of a position of the lense, a position of the target surface, and the position of the reflection in order to make the position on the first side of the lense be sufficiently in focus using the focus characteristic of the reflection.

4. The method of claim 3, further comprising the step of:
   determining a dimension of a reflection as captured on a light-capturing medium;
   wherein the step of making a determination includes determining whether the dimension of the reflection is at an approximate minimum size.

5. The method of claim 4, wherein the step of adjusting includes moving the light-capturing medium axially with respect to the lense in order to make the dimension of the reflection smaller.

6. The method of claim 1, wherein the step of detecting the reflection includes moving a receiving optical fiber end until at least a portion of the reflection is captured and light is maximized within the optical fiber.

7. The method of claim 6, wherein the step of making the determination includes determining whether the reflection is sufficiently small to be substantially captured within the receiving optical fiber end.

8. The method of claim 1, further comprising the step of adjusting, in an axial position, at least one of a position of the lense, a position of the target surface, and the position of the reflection until an approximate minimum dimension of the reflection is determined.

9. The method of claim 1, wherein the step of directing light from a light source includes directing either a diverging laser beam, other coherent or an incoherent point source.

10. The method of claim 1, wherein the step of directing light, from a light source includes transmitting light from an optical fiber.

11. The method of claim 1, wherein the step of detecting the reflection includes locating a cluster of illuminated elements on a optical detector array.

12. The method of claim 1, wherein the step of making the determination is performed without using the second light.

13. The method of claim 1, wherein the step of detecting the reflection includes moving a receiving single element detector or integrating optical device until the light is maximized on that element or integrating device.

14. The method of claim 1, wherein the step of detecting the reflection includes moving a receiving masked detector array includes locating a cluster of illuminated elements on the masked array.

15. The method of claim 1, further comprising the step of determining a dimension of the reflection as captured on a light-capturing medium, and using the dimension as the focus characteristic.

16. The method of claim 1, wherein a distance between the lense and the target surface is different than a distance between the lense and the light source.

17. The method of claim 1, wherein the step of making the determination includes determining whether the reflection passed through a mask prior to being captured on a light-capturing medium.

18. A method for positioning a fiber to receive a laser beam emitted from a laser in an optical communication assembly, the method comprising:
   directing light from a secondary light source through the lense and onto a target surface corresponding to where the laser is to be located when the optical communication assembly is put into operation, the secondary light source being positioned on a first side of the lense and the target surface being positioned on a second side of the lense;
   detecting, at a position on the first side of the lense, a reflection of the light from the secondary light source reflecting off of the target surface;
   making a determination, based at least in part on a focus characteristic of the reflection, whether the position on the first side of the lense would be sufficiently in focus for the laser.

19. The method of claim 18, wherein the step of detecting a reflection includes capturing the reflection on an image capturing medium.

20. The method of claim 19, wherein the step of making the determination includes determining a dimension of the reflection is it appears on the image capturing medium.

21. The method of claim 18, wherein the step of directing light from a secondary light source includes directing either an incoherent bema or a laser beam.

22. The method of claim 18, further comprising the step of adjusting a position of the laser until the position on the first side of the lense is determined to be in focus.

23. The method of claim 18, further comprising the step of fixing the laser in position with respect to the lense in an axial direction upon making the determination that position on the first side of the lense would be sufficiently in focus for the laser.

24. The method of claim 18, wherein the lense may be fixed or moveable relative to the reference plane.

25. The method of claim 18, wherein the step and method of determining the position of focus may also be used to determine position of a non-focused position of the light beam.

* * * * *